United States Patent [19]
Fields

[11] Patent Number: 6,102,462
[45] Date of Patent: Aug. 15, 2000

[54] MATTRESS AND SHEET MATERIAL CARRYING APPARATUS

[76] Inventor: John M. Fields, 75960 Hwy. 97, Wasco, Oreg. 97065

[21] Appl. No.: 09/211,884

[22] Filed: Dec. 9, 1998

[51] Int. Cl.$^7$ ..................................................... A45F 5/00
[52] U.S. Cl. ............................................ 294/152; 294/157
[58] Field of Search ............................ 294/74, 149, 152, 294/154–157, 165; 383/6, 16–18

[56] References Cited

U.S. PATENT DOCUMENTS

| | | | |
|---|---|---|---|
| 618,333 | 1/1899 | Colteryahn et al. | 294/157 |
| 799,793 | 9/1905 | Kinsella | 294/155 |
| 873,044 | 12/1907 | Hanson | 294/157 X |
| 2,508,795 | 5/1950 | Nielsen | 294/152 |
| 3,214,072 | 10/1965 | Brown | 294/157 X |
| 3,923,222 | 12/1975 | Groves | 294/157 |
| 4,119,250 | 10/1978 | Brutlag | 294/152 X |
| 5,102,178 | 4/1992 | Staats | 294/157 X |
| 5,503,448 | 4/1996 | Dewey | 294/157 X |
| 5,863,056 | 1/1999 | Hostetter | 294/157 X |

*Primary Examiner*—Johnny D. Cherry
*Attorney, Agent, or Firm*—Olson and Olson

[57] ABSTRACT

A carrier for the two-person transporting of beds, sheet material such as plywood or drywall, and innumerable other elongated, bulky loads is formed of a main strap loop arranged to freely encircle a load to be transported in its longitudinal direction, the main strap mounting a pair of depending, load-supporting sling strap members positioned on the main strap member in equidistant, spaced apart condition from the mid point of the main strap loop for supporting the weight of the load.

1 Claim, 2 Drawing Sheets

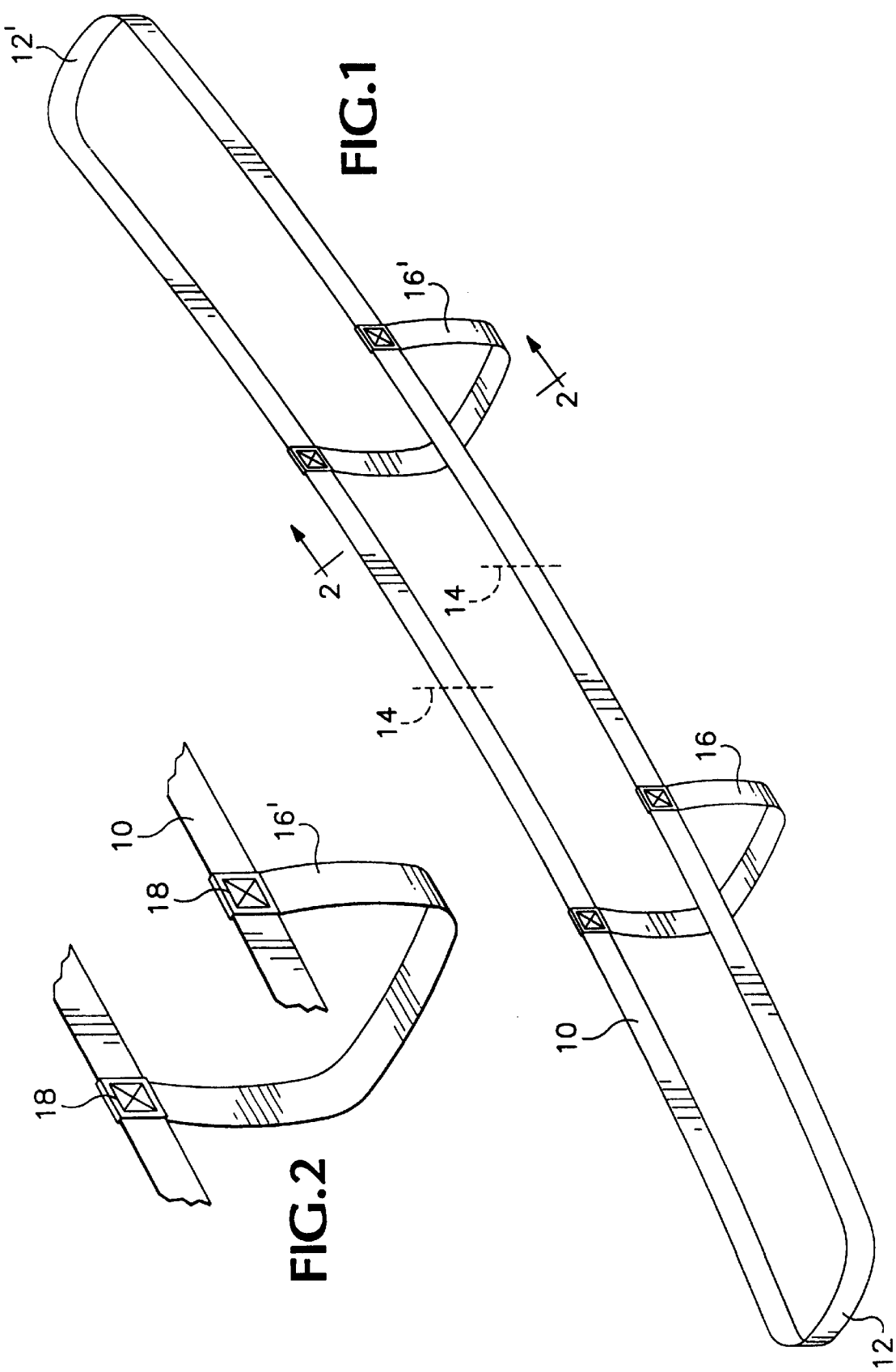

6,102,462

MATTRESS AND SHEET MATERIAL CARRYING APPARATUS

BACKGROUND OF THE INVENTION

This invention relates to carriers for facilitating the moving of bed mattresses and box springs, plywood and drywall sheets and other such large and bulky items, and more particularly to a greatly simplified carrying apparatus that employs a minimal structure for economical manufacture and for easy and convenient use by two persons.

Virtually everyone has had at least some experience at one time or another in moving a bed or large sheets of plywood or the like, and as such is familiar with how awkward and inconvenient such an endeavor is, even despite the fact that the load is most often not itself terribly heavy for two persons to otherwise easily manage. As is well known, it is the unwieldiness of the expansive load that makes it so cumbersome, particularly when maneuvering about in confined spaces as is commonly encountered around doorways, halls and rooms of a house for example, where low ceilings, light fixtures and other obstructions severely limit the height with which such mattresses, panels, etc. can be lifted and carried above the floor surface.

Various carriers to assist the moving of bed mattresses and box springs have been provided heretofore, but have entailed rather complex arrangements that require an unnecessarily high level of manufacture and related cost and involve rather time-consuming and detailed installation onto their load prior to their use. Examples of such prior art devices are disclosed in U.S. Pat. Nos. 4,119,250; 4,431,226; 4,521,045; 4,553,780 and 4,953,904. There is therefore a need in the marketplace for a simple to manufacture and simple and convenient to use carrier arrangement for beds, sheet material and the like.

SUMMARY OF THE INVENTION

In its basic concept, this invention provides a carrier for a bed mattress and box spring, sheet panel, and other loads, the carrier having a greatly simplified construction utilizing substantially only three lengths of strap material judiciously secured together to form a load-encircling, load-supporting, sling-like carrier arranged to contain and support a desired load and provide convenient hand-holds to facilitate the lifting and carrying of the loaded device by a pair of operators.

It is by virtue of the foregoing basic concept that the principal objective of this invention is achieved; mainly, the provision of a carrier of the class described which overcomes the limitations and structural complexities of earlier carrier devices for the purpose.

Another object of this invention is the provision of a carrier of the class described which is simple and easy to load and unload and greatly reduces the risk of back strain and other injuries.

Another object of this invention is the provision of a carrier of the class described which is capable of supporting a load both in a vertically upright condition and a horizontally disposed condition as may be needed to negotiate obstacles during transport.

A still further object of this invention is the provision of a carrier of the class described which is of extremely simple construction for economical manufacture and purchase.

The foregoing and other objects and advantages of the present invention will appear from the following detailed description, taken in connection with the accompanying drawings of a preferred embodiment.

BRIEF DESCRIPTION OF THE DRAWINGS

FIG. 1 is a perspective view of the simplified carrier construction of this invention shown in an extended, unloaded condition to illustrate its basic construction.

FIG. 2 is a fragmentary perspective view on an enlarged scale of one of the load support straps and one form of its securement to the load encircling main strap, the view taken along the line 2—2 in FIG. 1.

DESCRIPTION OF THE PREFERRED EMBODIMENT

Figure 3:
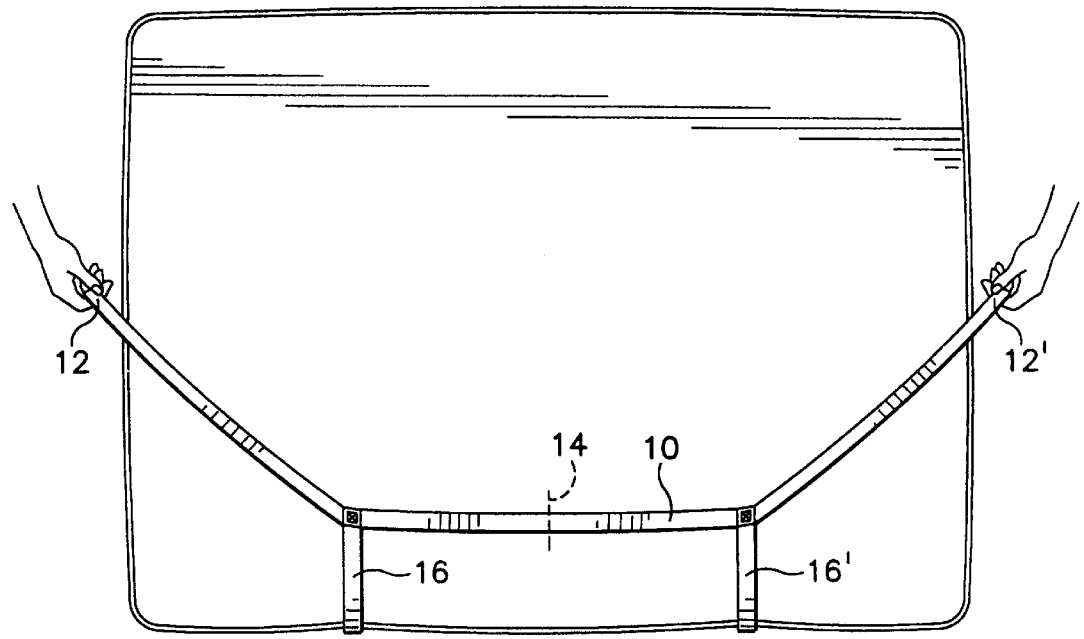
FIG. 3 is a fragmentary side elevation of the carrier of this invention operatively loaded with a bed mattress.
Figure 4:
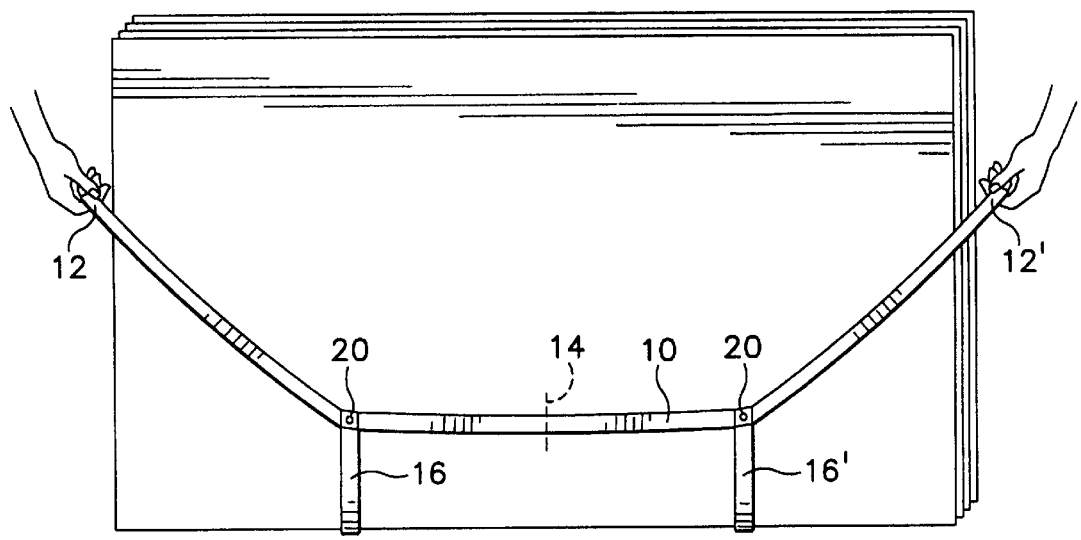
FIG. 4 is a fragmentary side elevation similar to FIG. 3 but showing the carrier loaded with a plurality of panels, such as sheets of plywood or drywall material, and illustrating a rivet securement of the load support straps to the load-encircling main strap.

The carrier of this invention is extremely simple both in construction and use, as is readily understandable in viewing the drawings. As is apparent in FIG. 1 of the drawings, the simplified carrier of this invention comprises a first, load-encircling main strap member 10 having a predetermined length and configured with its opposite terminal ends secured together to form a closed loop having a sufficient elongated length to freely encircle and contain an intended load longitudinally, as seen in FIGS. 3 and 4. As will be understood from viewing FIGS. 1 and 3 or 4, the closed loop formed by the main strap member 10 defines opposite end portions 12, 12' which serve as opposite hand-grasp, lifting portions for use by a pair of people carrying the load. Intermediate the outstretched end portions 12, 12' is the approximate midpoint of the closed loop, identified generally by the broken line 14 through the opposite main strap segments seen in FIG. 1.

The simplified carrier construction of this invention utilizes at least two load-supporting, sling strap members 16, 16' securely attached, as by stitching 18 (shown in FIG. 2) or alternatively by rivets 20 (FIG. 4), to the main strap 10 at predetermined points on the opposite main strap segments as will now be explained. In viewing FIGS. 1 and 3 or 4, it will be apparent that each load-supporting sling strap member 16, 16' terminates in a pair of opposite terminal ends which are securely attached at corresponding points to the opposite side segments of the elongated loop of the main strap 10. The mounting points of these at least two sling strap members on corresponding points on the main strap member are preferably located, as is apparent in the drawings, at corresponding, oppositely-equidistant, spaced apart points from the approximate midpoint 14 of the elongated main strap loop 10. Clearly, the maximum separation of the sling strap members 16, 16' in opposite directions from the midpoint 14 must be less than the length of a load to be carried, as will be obvious. Other, additional sling strap members (not shown) may be provided intermediate the aforementioned required two load-supporting sling strap members 16, 16' if desired or needed, as in the case of very long loads or other type of loads that may need additional support while being carried.

The various straps 10, 16, 16' may be formed of any suitable, flexible material capable of supporting the weight of an intended load, examples being suitable fabric material, vinyl or leather strapping material, cord material, etc. A preferred strap material for the purpose is the well known, webbing-type strap material formed of woven strands of natural or synthetic fibers and widely used in the marketplace, for example, as shoulder straps for everything from backpacks and luggage bags to video cameras, to heavy tie-down straps for cars, boats and trailers. This material, although light and very pliable, is extremely strong in its construction and accordingly, a relatively lightweight strap construction is capable of supporting as heavy a load as two persons would ever carry. Also, by virtue of its lightweight, pliant construction, the carrier can simply be folded up and stuffed into a small storage bag for convenient storage when not being used. The particular width and length of the various strap members may vary in any manner that may be desired or needed for the purpose.

The operation and use of the carrier of this invention is described hereinbelow in connection with the transport of a bed mattress: The carrier assembly is removed from its storage pouch and untangled, if necessary, and stretched out into its elongated loop condition of FIG. 1. The carrier may be loaded in one of two manners, the first being to lay the outstretched, elongated assembly on the floor and then pick up the mattress and place it onto the collapsed carrier on the floor and then, while stabilizing the mattress in a vertically upright condition resting on the carrier straps 16, 16' on the floor, the operators simply lift up on the handle portions 12, 12' until the carrier is pulled up into the operative condition of FIG. 3. The operators then lift the carrier while simply stabilizing the upper portion of the bed mattress against unrestrained tipping action with their free hands, and together carry the load about as desired.

As will be understood, since the main strap 10 effectively encircles the load, the bed mattress can easily be rotated from its vertical orientation shown in the drawings to a horizontal orientation while still being fully supported by the carrier held by the operators, as may be needed to navigate obstacles, etc. during transport. The main strap 10 encircling the mattress supports its weight and prevents it from "folding", as will be understood. A second manner of loading the carrier is to simply slip the outstretched carrier assembly onto one longitudinal side of a bed mattress disposed horizontally on its box springs, and then simply lift up on the carrier and rotate the bed mattress into the vertically oriented condition shown in FIG. 3. The operation of the carrier with the box springs or sheet panels or the like is substantially identical to that described in connection with the bed mattress.

From the foregoing it will be apparent to those skilled in the art that various changes other than those already described may be made in the size, type, number and arrangement of parts described hereinbefore without departing from the spirit of this invention and the scope of the appended claims. As will be clear, a wide variety of other types of loads can be handled with the carrier of this invention with but only inconsequential changes being made thereto. For example, simply by making the assembly of FIG. 3 or 4 longer, the carrier is ideally suited for carrying kayaks and canoes or the like. Appropriately proportioned, bookcases, cabinets and virtually innumerable other loads can be serviced by a carrier embodying the simple, but necessary features of this invention.

Having thus described my invention and the manner in which it may be used, I claim:

1. A carrier apparatus for carrying bed mattresses and box springs, sheet material and other expansive, bulky loads, the carrier apparatus consisting essentially of:

a) a single, load-encircling main strap member formed as a continuous, closed loop dimensioned to freely and loosely encircle a load to be carried, said closed loop configured to extend a spaced distance beyond the opposite ends of an encircled load to provide a pair of opposite hand grasp strap segments for lifting upon by a pair of operators, the main strap member defining and forming the uppermost portion of the carrier apparatus encircling a load, and b) load-supporting sling strap members attached to and extending downwardly from the main strap member forming underlying, downwardly-depending, spaced-apart, open-top slings spanning between corresponding, opposite attachment points on said closed loop of the main strap member, whereby with a load freely and loosely encircled about its horizontal direction by the closed loop of said main strap member, each of said downwardly-depending, spaced-apart slings extends from the main strap member for underlying and supporting a load placed thereon at spaced-apart points along the bottom edge of the load when the main strap member is grasped and lifted upon by a pair of operators.

* * * * *